(12) United States Patent
Lin

(10) Patent No.: US 10,589,843 B2
(45) Date of Patent: Mar. 17, 2020

(54) PROPULSION DEVICE

(71) Applicant: Yao-Chang Lin, Hsinchu (TW)

(72) Inventor: Yao-Chang Lin, Hsinchu (TW)

( * ) Notice: Subject to any disclaimer, the term of this patent is extended or adjusted under 35 U.S.C. 154(b) by 180 days.

(21) Appl. No.: 15/844,566

(22) Filed: Dec. 17, 2017

(65) Prior Publication Data

US 2018/0334243 A1  Nov. 22, 2018

(30) Foreign Application Priority Data

May 19, 2017 (TW) .............................. 106116790 A

(51) Int. Cl.
| | | |
|---|---|---|
| *B64C 11/48* | (2006.01) | |
| *B64D 35/04* | (2006.01) | |
| *B64C 11/18* | (2006.01) | |
| *B64C 27/57* | (2006.01) | |
| *B64C 27/59* | (2006.01) | |
| *B64C 11/20* | (2006.01) | |
| *B64C 11/00* | (2006.01) | |

(52) U.S. Cl.
CPC ............ *B64C 11/48* (2013.01); *B64C 11/001* (2013.01); *B64C 11/18* (2013.01); *B64C 11/20* (2013.01); *B64C 27/57* (2013.01); *B64C 27/59* (2013.01); *B64D 35/04* (2013.01)

(58) Field of Classification Search
CPC ....................................................... B64C 11/48
See application file for complete search history.

(56) References Cited

U.S. PATENT DOCUMENTS

| | | | | |
|---|---|---|---|---|
| 5,795,200 A | * | 8/1998 | Larkin .................... | B64C 11/48 440/81 |
| 7,472,863 B2 | * | 1/2009 | Pak ........................ | A63H 27/14 244/12.5 |
| 2015/0274292 A1 | * | 10/2015 | DeLorean ........... | B64C 29/0033 244/6 |

FOREIGN PATENT DOCUMENTS

JP             09011992 A  *  1/1997

* cited by examiner

*Primary Examiner* — Christopher Verdier
*Assistant Examiner* — Juan G Flores

(57) ABSTRACT

A propulsion device includes a cylinder body, a first set of blades, a second set of blades, a first transmission shaft, a second transmission shaft, a power gear box and an accelerator. The first set of blades and the second set of blades are disposed in an airflow channel of the cylinder body. The first transmission shaft is connected to the first set of blades and the second transmission shaft is connected to the second set of blades. The first transmission shaft and the second transmission shaft are interconnected by the accelerator. The first set of blades has a first rotation speed, and the accelerator causes the second set of blades to have a second rotation speed. The second rotation speed is greater than the first rotation speed to increase the propulsion force.

6 Claims, 4 Drawing Sheets

PROPULSION DEVICE

FIELD OF THE INVENTION

The present invention relates to a propulsion device, and more particularly to a propulsion device for use in a lightweight flying vehicle.

BACKGROUND OF THE INVENTION

Current aeronautical technology has been actively developing single-user vertical-lift vehicles. These current flying vehicles are flying at limited speeds less than some ground-based vehicles, such as cars or trains. Therefore, at present, since being unable to reach the general speed of the vehicles on the ground, so although the above aircraft is now available, this type of flying vehicles is still of no practical value in the present social life.

SUMMARY OF THE INVENTION

The present invention provides a propulsion device for providing greater propulsion force to a lightweight flying vehicle.

The present invention relates to a propulsion device for providing a propulsion force to a lightweight flying vehicle. The propulsion device includes a cylinder body, a first set of blades, a second set of blades, a first transmission shaft, a second transmission shaft, a power gear box and an accelerator.

The cylinder body has an airflow channel, an air inlet opening and an air discharge opening. The air inlet opening and the air discharge opening are respectively disposed at two ends of the cylinder body. The airflow channel is disposed between the air inlet opening and the air discharge opening.

The first set of blades is disposed in the airflow channel and configured to generate airflow entering the airflow channel from the air inlet opening and subsequently pushed toward the air discharge opening to generate the propulsion force.

The second set of blades is disposed in the airflow channel and adjacent to the air discharge opening relative to the first set of blades and configured to generate airflow to direct the airflow from the first set of blades toward the air discharge opening, thereby further discharging the airflow from the air discharge opening to generate the propulsive power.

The first transmission shaft is connected to a shaft center of the first set of blades and has a first rotation speed. The second transmission shaft is connected to a shaft center of the second set of blades.

The power gear box is configured to transmit a power from an engine to the first transmission shaft and the second transmission shaft.

The accelerator is engaged with the first transmission shaft and the second transmission shaft between the first set of blades and the second set of blades. The accelerator is configured to cause the second transmission shaft to have a second rotation speed by being driven by the first transmission shaft. The second rotation speed is greater than the first rotation speed. Preferably, a ratio of the second rotation speed to the first rotation speed is greater than or equal to 1.2.

The accelerator may be a planetary gear box including a sun gear and a planetary gear. The planetary gear is meshed with the sun gear. The first transmission shaft is connected to the planetary gear. The second transmission shaft is connected to the sun gear. By adjusting the ration of gear numbers, the acceleration effect can be generated.

In the propulsion device, the power source is a power gear box. The power gear box is disposed between the first set of blades and the second set of blades, and may be disposed between the first set of blades and the accelerator. That is, the power gear box is disposed on the first transmission shaft.

In order to increase the propulsion force, in addition to the accelerator will provide a great help, the air inlet opening should be greater than the air discharge opening. Through the combination of these technologies, a greater propulsion force is produced. The flying speed of the lightweight flying vehicle can reach or exceed the average speed of the vehicle on the ground. In addition, an additional fuel tank can be provided in the cylinder body, wherein the fuel tank is disposed in a ring-shaped to wrap the airflow channel thereby corresponding to a tapered volume of the airflow channel.

It is to be noted that the propulsion device may further include a rudder plate adjacent to the air discharge opening and disposed on a moving line of the airflow discharged from the air discharge opening. The rudder plate is configured to change a flow direction of the airflow discharged from the air discharge opening.

Based on the above, with the first set of blades, the second set of blades and the accelerator, the present invention can generate great propulsion force for the lightweight flying vehicle so as to enable the lightweight flying vehicle to fly at high speed.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
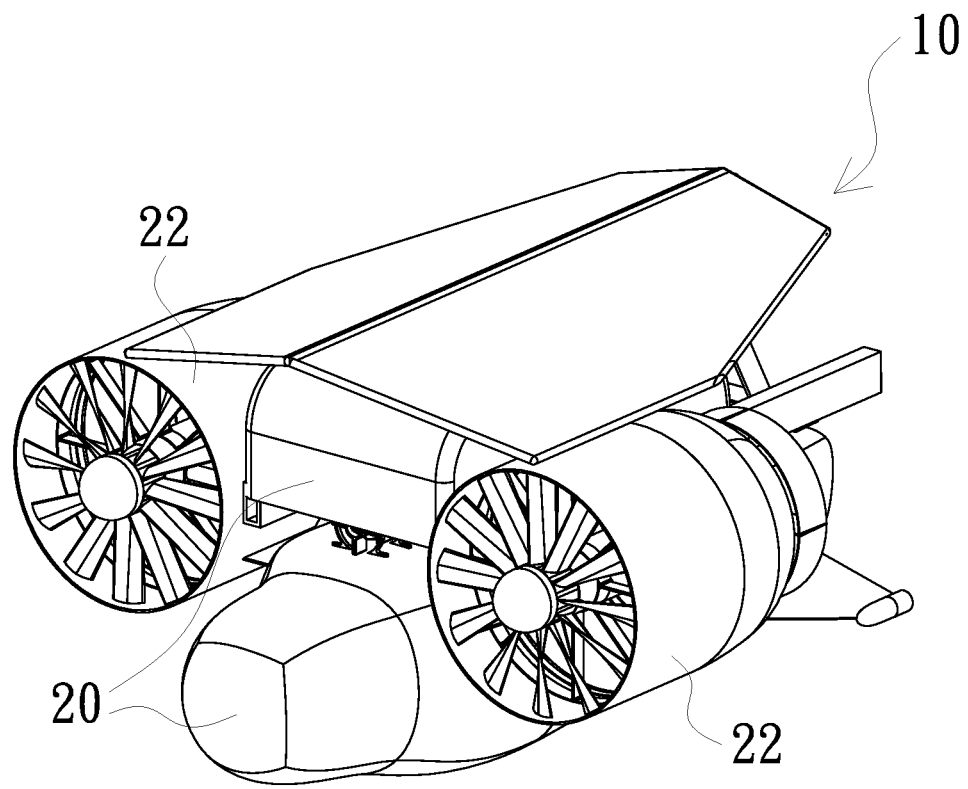
FIG. 1 is a schematic appearance view of a lightweight flying vehicle at high speed according to an embodiment of the present invention.

Please refer to FIG. 1, which is a schematic appearance view of a lightweight flying vehicle 10 during high-speed flight. A propulsion device(s) 22 is installed in the lightweight flying vehicle 10. In FIG. 1, two propulsion devices 22 are respectively installed on the left and right sides of the lightweight flying vehicle 10 and are configured to provide propulsion force required for the lightweight flying vehicle 10. The lightweight flying vehicle 10 can fly at low or high speeds. The lightweight flying vehicle 10 can take off and land at almost any location when flying at a low speed, and the lightweight flying vehicle 10 can fly over 500 kilometers per hour when flying at a high speed, thereby meeting a wide variety of uses.

Figure 2:
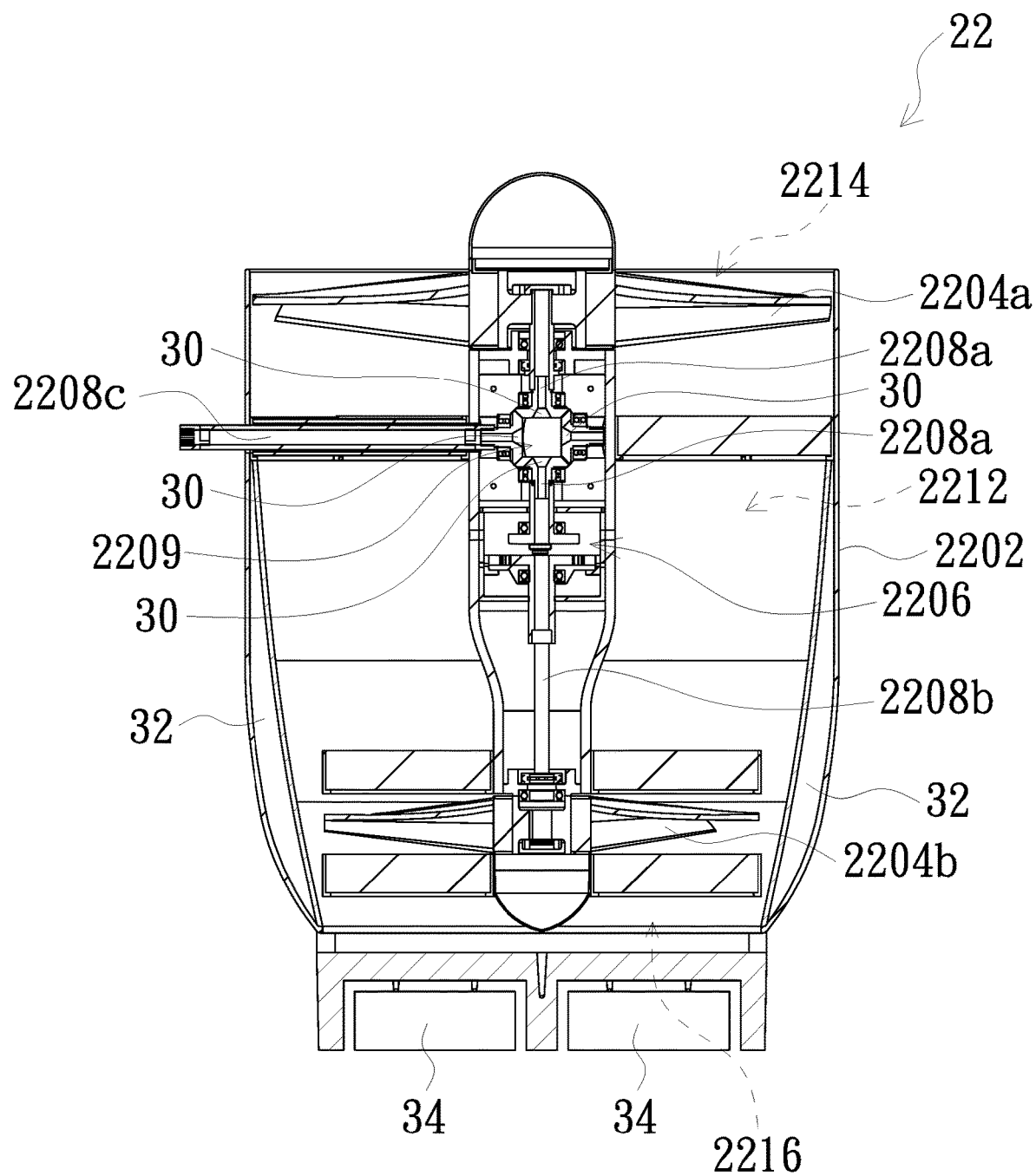
FIG. 2 is a cross-sectional view of the propulsion device of FIG. 1.

Please refer to FIG. 2, which is a cross-sectional view of the propulsion device of FIG. 1. As shown, the propulsion device 22 includes a cylinder 2202, a first set of blades 2204a, a second set of blades 2204b, a first transmission shaft 2208a, a second transmission shaft 2208b, a power gear box 2209 and an accelerator 2206. The cylinder body 2202 has an airflow channel 2212, an air inlet opening 2214 and an air discharge opening 2216. The air inlet opening 2214 and the air discharge opening 2216 are respectively located at two ends of the cylinder body 2202. The airflow channel 2212 is located between the air inlet opening 2214 and the air discharge opening 2216.

The first set of blades 2204a is disposed in the airflow channel 2212 and is configured to generate airflow. The airflow enters the airflow channel 2212 from the air inlet opening 2214 and is subsequently pushed toward the air discharge opening 2216 to generate propulsion force. The second set of blades 2204b is disposed in the airflow channel 2212 and adjacent to the air discharge opening 2216 relative to the first set of blades 2204a and is configured to generate airflow, so as to direct the airflow from the first set of blades 2204a toward the air discharge opening 2216, thereby further discharging the airflow from the air discharge opening 2216 to generate propulsive power.

The first transmission shaft 2208a is connected to the shaft center of the first set of blades 2204a and a power source so that to have a first rotation speed. In FIG. 2, the power gear box 2209 is disposed in the middle of the first transmission shaft 2208a to divide the first transmission shaft 2208a into an upper half and a lower half. The second transmission shaft 2208b is connected to the shaft center of the second set of blades 2204b. The power gear box 2209 is connected to a power source, and the power generated by the power source is transmitted by the power gear box 2209.

The accelerator 2206 is disposed between the first set of blades 2204a and the second set of blades 2204b and is engaged with the first transmission shaft 2208a and the second transmission shaft 2208b. The accelerator 2206 is configured to cause the second transmission shaft 2208b to have a second rotation speed by being driven by the first transmission shaft 2208a, wherein the second rotation speed must be greater than the first rotation speed, and the ratio of the second rotation speed to the first rotation speed is preferably greater than or equal to 1.2. Thus, the airflow exiting the air discharge opening 2216 can be enhanced to significantly enhance the propulsion force.

It is to be noted that in the propulsion device 22, the power source is the power gear box 2209. The power gear box 2209 is disposed between the first set of blades 2204a and the second set of blades 2204b and is disposed between the first set of blades 2204a and the accelerator 2206. That is, the power gear box 2209 is disposed on the first transmission shaft 2208a to divide the first transmission shaft 2208a into an upper half and a lower half.

In FIG. 2, the power gear box 2209 is four docking bevel gears 30. The leftmost bevel gear 30 is connected to a third transmission shaft 2208c. The third transmission shaft 2208c is connected to a power source outside the propulsion device 22, generally directly or indirectly connected to the engine in the lightweight flying vehicle 10. For the propulsion device 22, the engine is located outside. The uppermost bevel gear 30 is configured to transmit power to the first set of blades 2204a through the upper half of the first transmission shaft 2208a to drive the first set of blades 2204a to rotate. The lowermost bevel gear 30 is configured to transmit power to the accelerator 2206 through the lower half of the first transmission shaft 2208a. The rightmost bevel gear 30 is configured to balance the other three bevel gears 30 only.

According to Bernoulli's principle, the air inlet opening 2214 may be larger than the air discharge opening 2216 and the airflow channel 2212 may be tapered from the air inlet opening 2214 to the air discharge opening 2216, so as to accelerate the speed of the airflow at the air discharge opening 2216 and thereby further enhancing the propulsion force of the propulsion device 22. In addition, the cylinder body 2202 may further include a fuel tank 32. The fuel tank 32 may be disposed in a ring-shape to wrap the airflow channel 2212 thereby corresponding to the tapered volume of the airflow channel 2212. The fuel tank 32 may serve as a primary fuel tank or an auxiliary fuel tank to save a lot of space to accommodate more fuel.

The propulsion device 22 further includes a rudder plate 34. The rudder plate 34 is adjacent to the air discharge opening 2216 and is disposed on the moving line of the airflow discharged from the air discharge opening 2216. The rudder plate 34 is configured to change the flow direction of the airflow discharged from the air discharge opening 2216. Since the strong propulsion force of the propulsion device 22 which means that the discharged airflow is strong, a slight deflection can obtain an ideal steering effect by simply attaching the rudder plate 34 for steering in the moving line of the discharged airflow.

Figure 3:
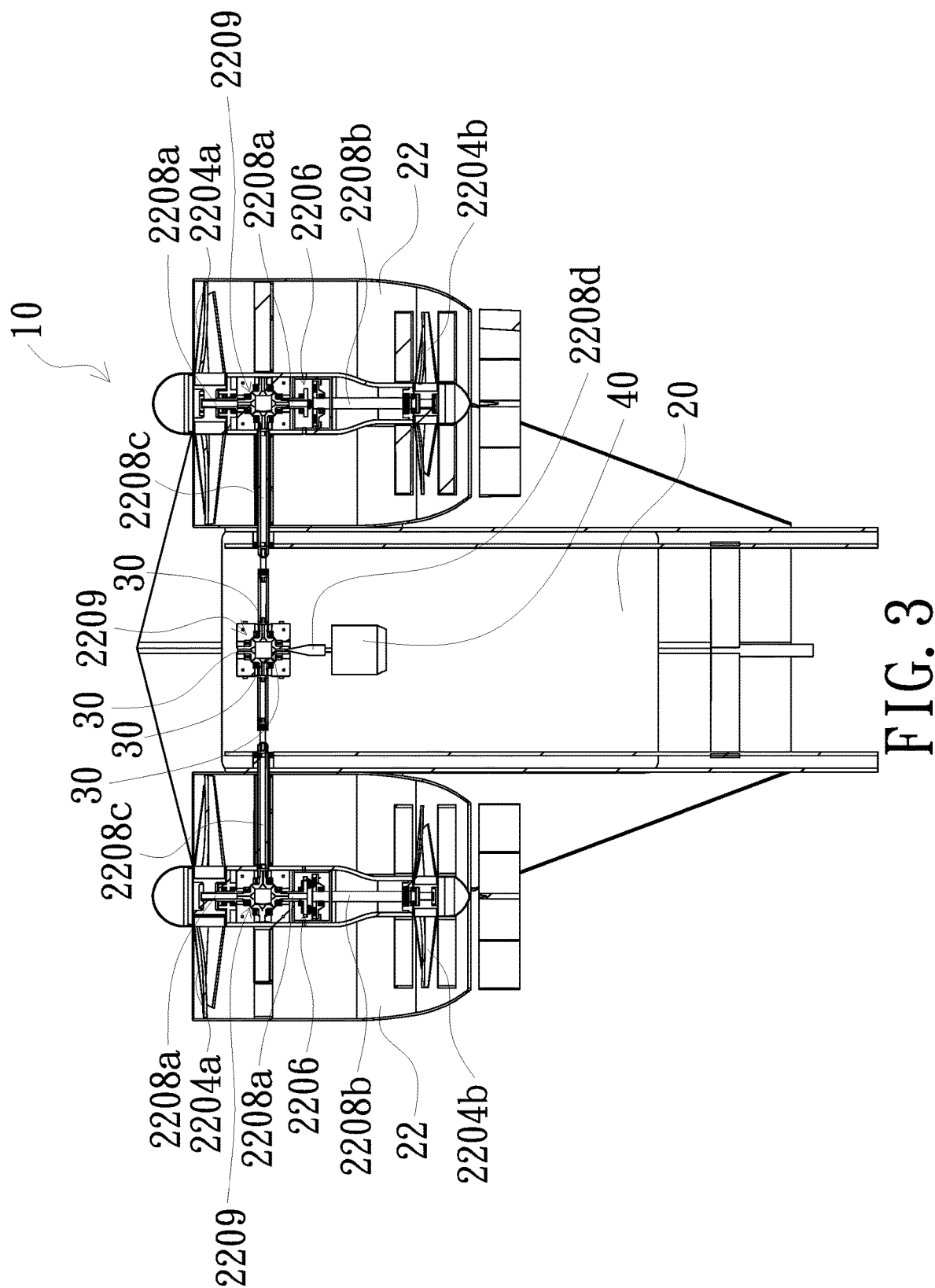
FIG. 3 is a cross-sectional view of the lightweight flying vehicle of FIG. 1 at low speed.

Referring to FIG. 3, which is a cross-sectional view equivalent to the lightweight flying vehicle 10 of FIG. 1 being erected. As shown in FIG. 3, the lightweight flying vehicle 10 includes a main body portion 20 and two propulsion devices 22 respectively disposed on the left and right sides of the main body portion 20. The cross-sectional view of FIG. 3 clearly shows the structure of the power transmission. The main body portion 20 has an engine 40. The engine 40 is the above-mentioned power source outside the propulsion device 22. The main body 20 has a power gear box 2209 above the engine 40. The power generated by the engine 40 is transmitted to the power gear box 2209 in the main body portion 20 by the fourth transmission shaft 2208d.

The power gear box 2209 has four bevel gears 30, and the principle of which is the same as that described above. Thus, the power can be transmitted to the left and right two third transmission shafts 2208c. The left and right two third transmission shafts 2208c then transmit the power to the first transmission shafts 2208a of the left and right two propulsion devices 22 through the four bevel gears 30 in the power gear boxes 2209 of the left and right two propulsion devices 22, respectively. The upper half of the first transmission shaft 2208a transmits the power to the first set of blades 2204a. The lower half of the first transmission shaft 2208a transmits the power to the accelerator 2206. The accelerator 2206 changes the rotation speed of the second transmission shaft 2208b to further accelerate the rotation speed of the second set of blades 2204b.

Figure 4:
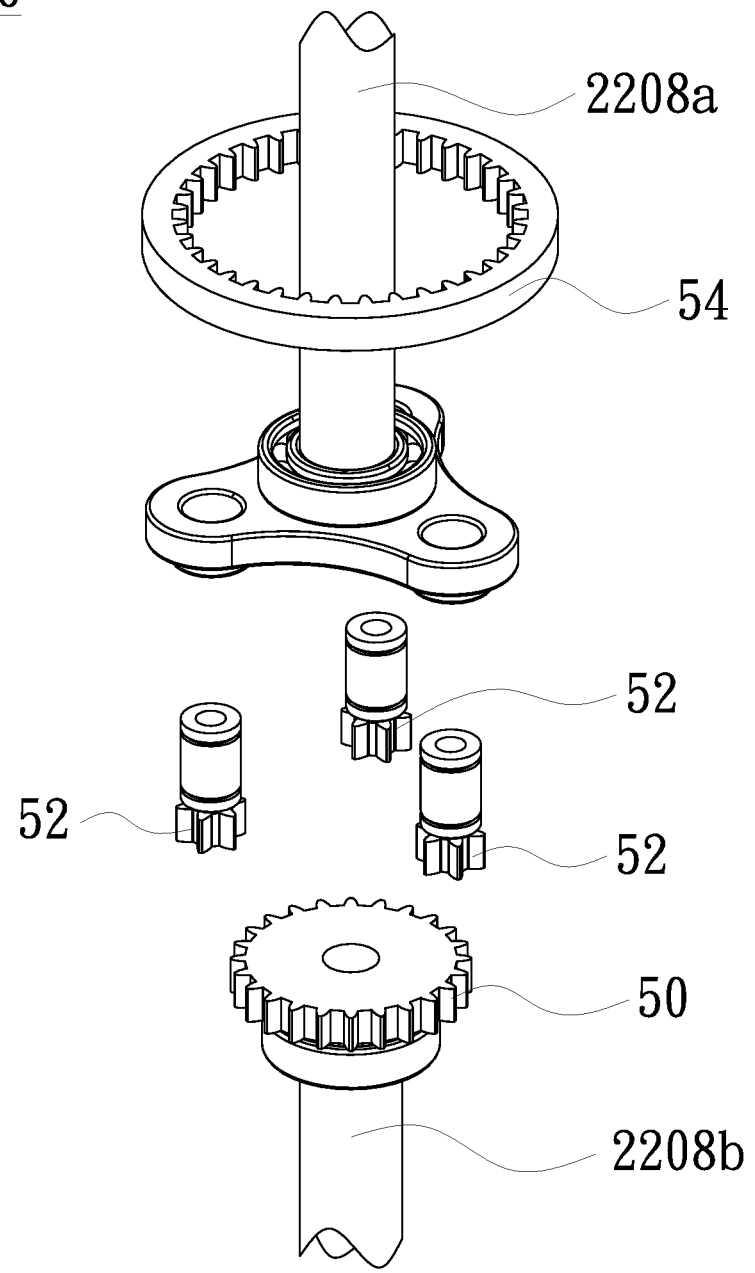
FIG. 4 is an exploded view of the accelerator in FIG. 1.

Please refer to FIG. 4, which is an exploded view of the accelerator 220b in the propulsion device 22 of FIG. 1. The accelerator 2206 may be a planetary gear box. As shown in FIG. 4, the planetary gear box includes a sun gear 50 and a planetary gear 52. The sun gear 50 is disposed in the middle of the planetary gear 52. The planetary gear 52 is uniformly meshed with the sun gear 50. A ring gear 54 is meshed with the outside of the planetary gear 52 to stabilize the planetary gear 52. The first transmission shaft 2208a is connected to the planetary gear 52. The second transmission shaft 2208b is connected to the sun gear 50. By adjusting the relative gear numbers of the sun gear 50 and the planetary gear 52, the ideal rotation speed ratio can be adjusted. For example, the rotation speed ratio can be adjusted to be greater than or equal to 1.2 as described above.

In summary, in the propulsion device 22, the design of the first set of blades 2204a, the second set of blades 2204b and the accelerator 2206 can generate great propulsion force for the lightweight flying vehicle 10 so that the lightweight flying vehicle 10 can fly at high speed thereby having commercial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A propulsion device comprising:
   a cylinder body, having an airflow channel, an air inlet opening and an air discharge opening, wherein the air inlet opening and the air discharge opening are respectively disposed at two ends of the cylinder body, and the airflow channel is disposed between the air inlet opening and the air discharge opening;
   a first set of blades, disposed in the airflow channel and configured to generate airflow entering the airflow channel from the air inlet opening and subsequently pushed toward the air discharge opening to generate the propulsive power;
   a second set of blades, disposed in the airflow channel and adjacent to the air discharge opening relative to the first set of blades and configured to generate airflow to direct the airflow from the first set of blades toward the air discharge opening, thereby further discharging the airflow from the air discharge opening to generate the propulsive power;
   a first transmission shaft, connected to a shaft center of the first set of blades and having a first rotation speed;
   a second transmission shaft, connected to a shaft center of the second set of blades;
   a power gear box, configured to transmit a power from an engine to the first transmission shaft and the second transmission shaft; and
   an accelerator, engaged with the first transmission shaft and the second transmission shaft between the first set of blades and the second set of blades, wherein the accelerator is configured to cause the second transmission shaft to have a second rotation speed by being driven by the first transmission shaft, and the second rotation speed is greater than the first rotation speed; and
   a fuel tank, wherein the airflow channel tapers from the air inlet opening to the air discharge opening, and the fuel tank is disposed in a ring-shape to wrap the airflow channel thereby corresponding to a tapered volume of the airflow channel.

2. The propulsion device according to claim 1, wherein the power gear box is disposed between the first set of blades and the second set of blades and is disposed between the first set of blades and the accelerator.

3. The propulsion device according to claim 1, wherein the air inlet opening is larger than the air discharge opening.

4. The propulsion device according to claim 1, wherein a ratio of the second rotation speed to the first rotation speed is greater than or equal to 1.2.

5. The propulsion device according to claim 1, wherein the accelerator is a planetary gear box comprising a sun gear and a planetary gear, the planetary gear is uniformly meshed with the sun gear, the first transmission shaft is connected to the planetary gear, and the second transmission shaft is connected to the sun gear.

6. The propulsion device according to claim 1, further comprising a rudder plate adjacent to the air discharge opening and disposed on a moving line of the airflow discharged from the air discharge opening, wherein the rudder plate is configured to change a flow direction of the airflow discharged from the air discharge opening.

* * * * *